(12) United States Patent  
Williams

(10) Patent No.: US 8,183,460 B2  
(45) Date of Patent: May 22, 2012

(54) FOLDABLE RACEWAY ASSEMBLY

(76) Inventor: James Williams, Branchburg, NJ (US)

( * ) Notice: Subject to any disclaimer, the term of this patent is extended or adjusted under 35 U.S.C. 154(b) by 341 days.

(21) Appl. No.: 12/538,239

(22) Filed: Aug. 10, 2009

(65) Prior Publication Data

US 2011/0031011 A1    Feb. 10, 2011

(51) Int. Cl.
*H02G 3/04* (2006.01)
(52) U.S. Cl. ..... 174/68.1; 174/68.3; 174/481; 174/72 A; 174/97; 52/220.1
(58) Field of Classification Search ............ 174/480, 174/481, 68.1, 68.3, 60, 95, 99 R, 72 R, 97, 174/96, 135, 72 A; 220/3.2, 3.3, 3.5, 3.8; 384/134, 135; 52/220.1, 220.3, 220.7, 220.5, 52/239; 439/207–216; 428/333; 138/156, 138/118, 128, 167, 168
See application file for complete search history.

(56) References Cited

U.S. PATENT DOCUMENTS

| | | | |
|---|---|---|---|
| 4,391,303 A * | 7/1983 | Holgersson | 174/68.3 |
| 4,530,865 A * | 7/1985 | Sprenger | 174/68.3 |
| 4,725,463 A * | 2/1988 | Baumber et al. | 138/128 |
| 4,953,735 A | 9/1990 | Tisbo et al. | |
| 5,235,136 A | 8/1993 | Santucci et al. | |
| 5,814,767 A * | 9/1998 | Katz | 174/68.1 |
| 6,029,713 A | 2/2000 | Miranda | |
| 6,084,180 A * | 7/2000 | DeBartolo et al. | 174/481 |
| 6,107,575 A | 8/2000 | Miranda | |
| 6,380,484 B1 * | 4/2002 | Theis et al. | 174/68.3 |
| 7,049,508 B2 | 5/2006 | Bushey et al. | |
| 7,408,114 B2 | 8/2008 | VanderVelde et al. | |
| 7,610,722 B1 * | 11/2009 | Carroll | 138/168 |
| 2007/0051536 A1 | 3/2007 | Williams | |
| 2007/0084618 A1 | 4/2007 | VanderVelde et al. | |

* cited by examiner

*Primary Examiner* — Angel R Estrada
(74) *Attorney, Agent, or Firm* — Baker & Rannells, PA

(57) ABSTRACT

A foldable elongate raceway of thermoplastic unitary construction for cables and wires is provided. The raceway includes a plurality of hinges, a first wall configured with a first interior hook and a cover hook catch, a second wall with a second interior hook, and a bottom wall substantially perpendicular to the first and second walls, wherein the bottom wall includes first and second L-shaped hook catches, and first and second catch stops, wherein the first and second interior hooks slidingly engage with the first and second hook catches and resist torsional forces by means of the catch stops. The raceway also includes a unitarily formed cover wherein the cover is configured to include a cover hook and a cover hook stop that releasably engage with the cover hook catch of the first wall, and an adhesive strip.

9 Claims, 2 Drawing Sheets

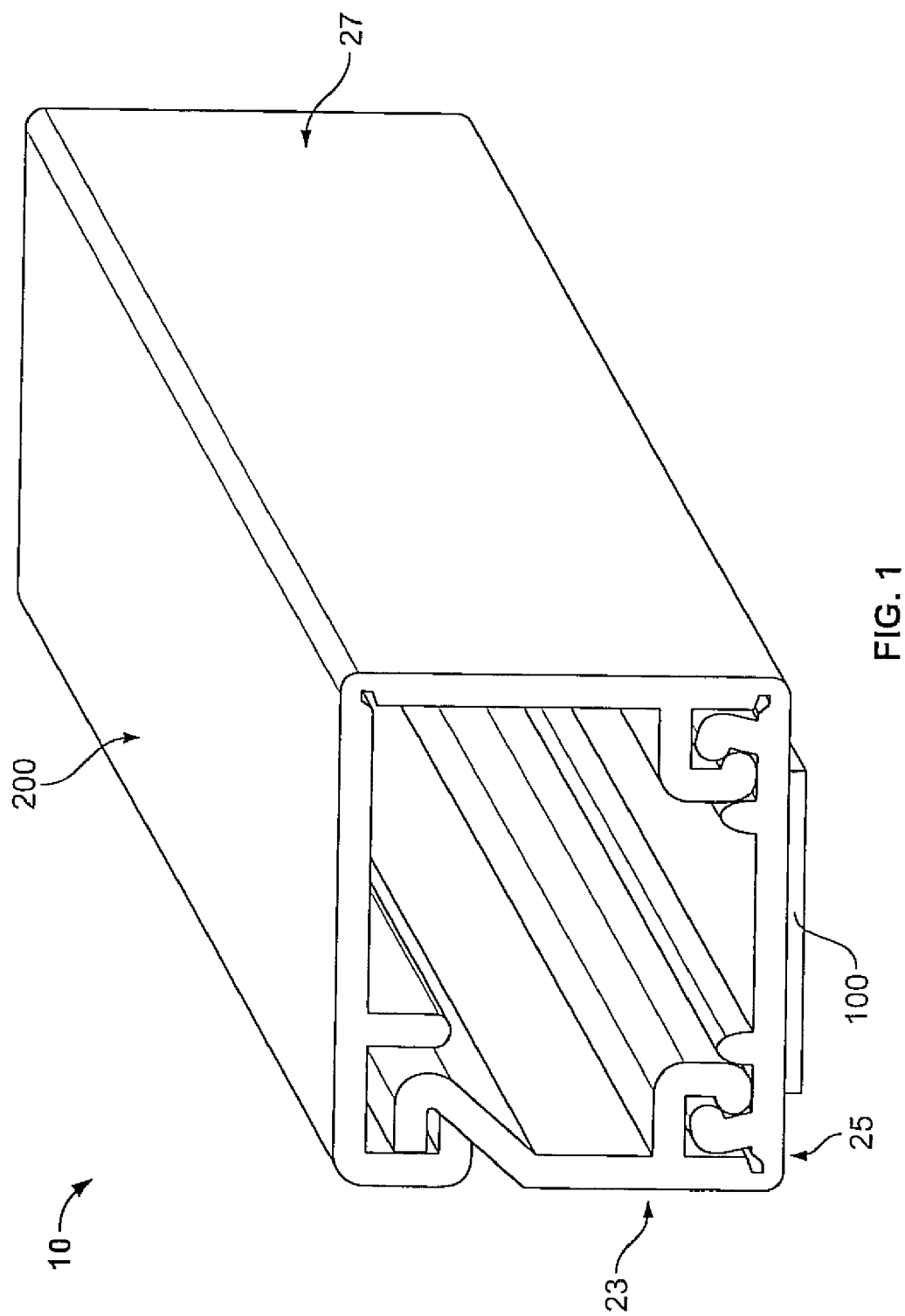

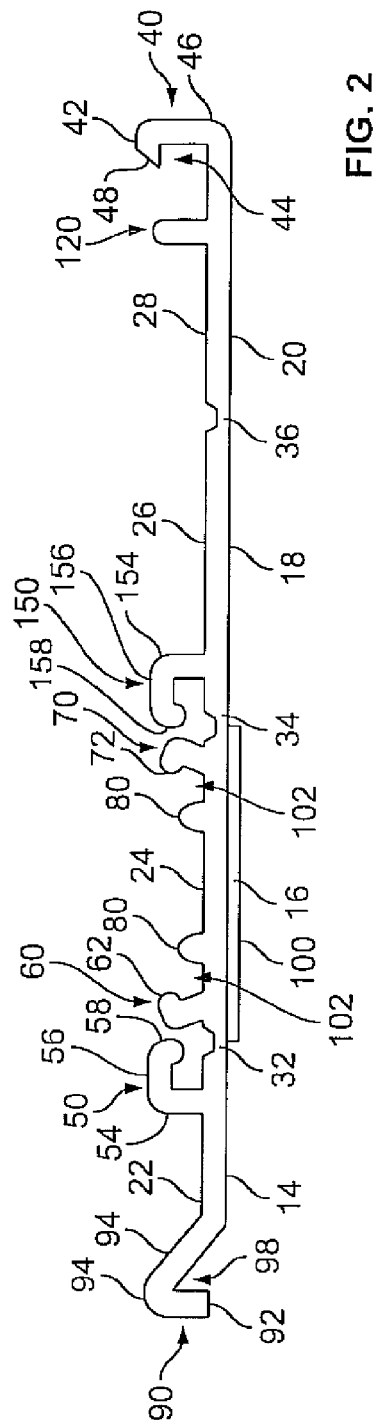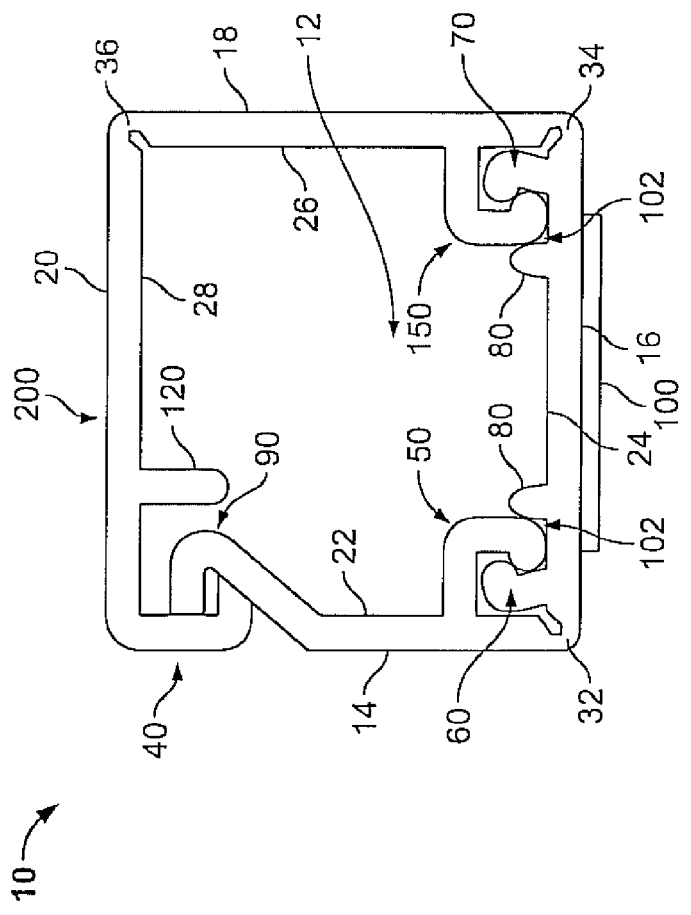

FOLDABLE RACEWAY ASSEMBLY

FIELD OF THE INVENTION

The present invention relates to a foldable plastic raceway assembly. Specifically, the present invention relates to a foldable plastic raceway assembly that has improved structures that aid in assembly and are further designed to resist opening or deformation against torsional forces which result in the unintended opening of the raceway.

BACKGROUND OF THE INVENTION

This invention relates to a molded plastic article used for the installation of electronic and electrical wires. Electrical raceways are mounted on interior walls to take the place of running wires through wall cavities and to hide wires from view. Electrical raceways simplify the task of wiring and reduce the need to punch holes through walls.

Raceways are typically provided as either metal sections or as two piece rigid plastic sections in three or four foot lengths. Many raceways on the market provide for a deformable slotted cover through which wires can be accessed. Other raceways are provided with fully detachable covers that snap into place. For long runs, current raceways are assembled as a series of long parts which are interlocked at connecting members or at junction boxes.

Plastic raceways are manufactured such that they deform from their typical cross-sectional shape upon torsional forces. Application of these torsional forces results in the raceway popping open or a permanent loss in the desired cross-sectional shape. If the raceways attach to the wall surfaces with adhesive strips, such actions also result in the adhesive strips losing contact with the walls. Workmen are then forced to drill through the raceway to secure the raceway to the walls with additional screws puncturing the walls onto which it is attached.

An example of such a raceway is shown in U.S. patent application Ser. No. 11/221,211 to Williams. The raceway disclosed therein includes a number of hinges and locking mechanisms, but does not include sufficiently designed structures to prevent torsional deformation along the longitudinal axis nor does it provide sufficient structure to ease assembly of the final construction. The raceway disclosed also does not disclose a raceway with a substantially square cross section with locking mechanisms that facilitate assembly.

Another example of such a raceway is shown in U.S. Pat. No. 4,953,735 to Tisbo, et al. The raceway disclosed therein includes a three-walled duct with two hinges onto which a cover must be placed. The Tisbo structure discloses mechanisms that upon assembly form a substantially 90 degree angle between the side walls and the bottom of the raceway, but does not include a locking mechanism to prevent deformation upon the application of torsional forces.

SUMMARY OF THE INVENTION

The molded article of this invention overcomes the disadvantages and shortcomings of the problems of the prior art by providing a foldable raceway that is easy to transport, easy to assemble, locks into place upon folding, and that is highly resistant to torsional forces. It is manufactured and sold as a flat strip in 50 and 100 foot rolls. An installer cuts the article to the desired length and releasably forms the sides by bending the raceway at preformed hinges, and releasably closes the cover securing it closed by a hook and catch. The resulting raceway has a low profile and paintable surface that allows it to be used on installations where minimum presence is required. A builder needs to only rollout the length he needs, cut it, then fold and snap it into a rigid channel shape. The raceway is attached by removing the tape backing and applying it to clean dry surface. Once assembled and installed, the raceway of this invention retains a substantially square cross-section upon application of a torsional force and thus is highly resistant to inadvertent opening of the cover and will not deform or collapse under typical torsional forces. However, the cover can be opened if necessary and the walls can release.

BRIEF DESCRIPTION OF THE DRAWINGS

To assist those of ordinary skill in the art in making and using the disclosed device, reference is made to the appended figures, in which:

FIG. 1 is a perspective view of a raceway assembly after it has been configured to a box-shaped configuration;

FIG. 2 is a front elevational view of the flat, unformed configuration; and

FIG. 3 is a cross-sectional front elevational view of the formed configuration.

DETAILED DESCRIPTION OF THE EXEMPLARY EMBODIMENT

The present disclosure provides an advantageous device for providing a conduit for electrical wires or cables. More particularly, the present disclosure provides a unitary, folding raceway configured for ease of transportation, assembly and attachment to an interior wall surface. The present disclosure also provides a raceway with a higher stability to torsional forces, including forces applied during assembly that could result in bowing of the outer surfaces.

Referring to FIGS. 1-3, a raceway 10 constructed in accordance with an exemplary embodiment of the present invention is shown. The raceway is a unitarily molded, elongated duct or conduit adapted to hold one or more electrical wires along the longitudinal axis of its interior cavity 12. The raceway is further adapted to be attached to a surface, such as an interior wall, by means of an adhesive strip 100.

As shown in FIG. 3, the raceway 10 is manufactured by an extrusion process from a single piece of plastic, that when folded defines an interior cavity 12 with a substantially square cross-section in which electrical wires are placed. When formed, the wires run along the length of the raceway along its longitudinal axis, both securing the wires and hiding them from view.

As show in FIG. 3, upon assembly, the raceway 10 has three perimeter walls 23, 25, 27 and a cover 200. The perimeter walls include a first wall 23, defined by a first exterior surface 14 and a first interior surface 22 opposite thereto, a bottom wall 25, substantially perpendicular to the first wall 23, wherein the bottom wall 25 is defined by a bottom exterior surface 16 and a bottom interior surface 24 opposite thereto, and a second wall 27, substantially parallel to the first wall 23, wherein the second wall 27 includes a second exterior surface 18 and a second interior surface 26 opposite thereto. The cover 200 is defined by a top exterior surface 20 and a top interior surface 28 opposite thereto.

Referring to FIG. 3, the unitary, unfolded blank of the raceway is shown in cross section. The raceway is manufactured of one piece thermoplastic extruded plastic construction. For shipment, the raceway blank is rolled and stored in transportation boxes. Once on site, the assembler unrolls the blank, measures out an appropriate length, and cuts it. The cut strip is attached to a wall by means of the adhesive strip 100.

The raceway is them assembled by folding and snapping it into its final squared form after placing the wires along the longitudinal axis, and closing the assembly by snapping the cover 200 shut to form the interior cavity 12.

Referring to FIG. 2, in its unfolded form, exterior surfaces 14, 16, 18 and 20 form the bottom surface of the blank. Interior surfaces 22, 24, 26 and 28 likewise combine to form the top surface of the blank. Hinges 32, 34, and 36 are located at intervals along the length of the blank and are substantially v-shaped, formed during the extrusion process as concave indentations in the interior surfaces 22, 24 and 26. During assembly, the blank is releasably formed by folding the raceway 10 along the hinges 32, 34, and 36 to form the raceway walls 23, 25, 27, and the cover 200.

During the folding process, the raceway walls 23, 25, 27 are formed and secured in place by means of releasably locking structures found at the interior surfaces 14, 16, 18 of the walls 23, 25, and 27. The first wall 23 and second wall 27 are snapped into place, whereby the locking mechanisms are releasably affixed at the resulting lower interior corners of the raceway at the hinges 32 and 34.

The locking structures include a first catch 60 located on the bottom interior surface 24, and a second catch 70, the second catch 70 being a essentially a mirror image of the first catch 60. The first catch 60 and second catch 70 are substantially L-shaped in cross-section and extend uniformly along the longitudinal axis of the raceway. Catches 60, 70 are configured to extend outwardly from the interior bottom wall surface 24 at an angle that is slightly non-perpendicular to the bottom wall interior surface 24. The catches 60,70 are designed to create raceway stability through constant angular, compression forces that occur between the catches 60, 70 and the first and second perimeter walls 23, 27 upon folding the raceway at hinges 32, 34.

The catches 60, 70 have rounded upper surfaces and are designed to include catch heels, 62, 72 at the distal edges of the catches 60, 70. The catches 60, 70 provide for ease of assembly by providing a surface over which interior wall hooks 50, 150 can slidingly interact. Catch heels 62, 72 are designed to include curved ends over which interior wall hooks 50, 150 slidingly pass. The interior wall hooks 50, 150 engage with the catches 60, 70 at the heels 62, 72, to secure and to support the first and second perimeter walls 23, 27.

The locking structures are also defined by catch stops 80, 82 also located on the bottom interior surface 24. The catch stops 80, 82 have an arcuate upper surface and extend along the length of the longitudinal axis of the raceway. Channels 102 are formed from the longitudinally extending troughs in between catches 60, 70 and the catch stops 80, 82. Upon folding the raceway 10 along bottom hinges 32, 34, the channels 102 releasably receive interior wall hooks 50, 150.

The interior walls hooks 50, 150 resemble C-shaped in cross-section. Interior wall hooks 50, 150 are designed to securely engage with the catches 60, 70 and the catch stops 80, 82 to form the perimeter walls 23, 25, 27.

Upon folding the raceway at its lower hinges 32, 34, the interior wall hooks 50, 150 fit into the channels 102 and engage with the catches and catch stops to secure the perimeter walls 23, 25, 27 in place. The first and second perimeter walls 23, 27 form substantially 90 degree angles with the bottom wall 25. First interior wall hook 50 is configured with an upright section 54 that is perpendicular to first perimeter wall 23, and also includes top section 56, and a curved hook section 58. Wall hook 150 is formed as a mirror image thereof with an upright part 154, top section 156, and curved hook section 158. First interior wall hook 50 slides over the rounded top surface of the first catch 60 and passes over the locking heel 62. Curved hook section 58 snaps under the rounded locking heel 62 to releasably secure the wall into place in the channel 102.

Once snapped into place, the first interior wall hook 50 resists torsional deformation by means of both the locking heel 62 and catch stop 80. Upon application of a counter clockwise torque, the first interior wall hook 50 is pulled in a corresponding counter clockwise direction. However, the catch stop 80 presses against the interior wall hook outer surface 56 and resists the angular force. The locking heels 62, 72 further resist torsional forces that would otherwise tend to rotate the interior walls hooks out of place and thus provide another piece of the locking mechanism. The second wall 27 is assembled and locked into place in a similar manner. The second interior hook 150 exerts a compression force against catch stop 82 in response to a clockwise torque. Once the perimeter walls 23, 25, 27 are locked into place, the cover 200 can be folded over its hinge 36 and likewise locked into place to complete assembly.

Referring to FIGS. 1-3, the cover 200 is unitarily formed as part of the blank. The cover 200 is configured to include a cover hook 40 at its distal edge which connects to a clasp 90 located at the distal edge of the first wall 23. On assembly, clasp 90 curves toward the cavity 12 of the raceway then back toward the first wall 23. Clasp 90 includes a straight edge 92 at its distal end and clasp cavity 98. Clasp 90 is essentially question mark shaped. Cover hook 40 includes a top segment 46 that is substantially perpendicular to cover 200. Cover hook 40 also includes a curved segment 42 and a sharp edge 48 forming a hook cavity 44. The cover 200 includes a cover hook stop 120. Cover hook stop 120 is an elongated tab with an arcuate upper surface.

The raceway 10 achieves its final square cross-sectional shape upon engagement of the cover 200. Cover 200 is assembled by bending the raceway 10 at cover hinge 36. Cover 200 is releasably fastened by slidingly engaging cover hook 40 with clasp 90. Cover hook stop 120 is designed to keep the cover 200 in its closed position by acting as an obstacle against which clasp 90 presses in resistance to opening forces.

It is understood that a person skilled in the art may make many variations and modifications without departing from the spirit and the scope of the present invention.

I claim:

1. A foldable elongate raceway of thermoplastic unitary construction, said raceway comprising:
   a plurality of hinges;
   a first wall having an interior surface and an exterior surface opposite thereto; said first wall configured to include a first interior hook;
   a second wall substantially parallel to said first wall, said second wall having a second interior surface and a second exterior surface opposite thereto, wherein said second wall is configured to include a second interior hook;
   a bottom wall substantially perpendicular to said first wall and said second wall, said bottom wall having a bottom interior surface and a bottom exterior surface opposite said bottom interior surface, wherein said bottom interior surface is configured to include a first hook catch, a second hook catch, a first catch stop and a second catch stop; said first hook catch having a substantially L-shaped design and said second hook catch having a substantially L-shaped design wherein said second hook catch is configured to be a mirror image of said first hook catch, and wherein said first hook catch includes a first catch heel, and said second hook catch includes a second catch heel; wherein said first catch heel and said second catch heel extend outwardly from said first hook catch and said second hook catch respectively, and wherein said first interior hook and said second interior hook releasably engage with said first catch heel and said second catch heel respectively;

and a cover, said cover having an interior cover surface and an exterior cover surface opposite said interior cover surface, said cover configured to include a cover hook and a cover hook stop;

wherein said first hook catch and said second hook catch are designed to extend outward from said bottom interior surface of said bottom wall at an angle that is slightly non-perpendicular from said bottom interior surface of said bottom wall.

2. The raceway of claim 1 wherein said first hook catch and said second hook catch have rounded upper surfaces.

3. The raceway of claim 1 wherein said first hook catch heel and said second hook catch heel have rounded outer surfaces.

4. The raceway of claim 1 wherein said first hook catch heel and said second hook catch heel releasably engage with said first interior hook and said second interior hook respectively.

5. The raceway of claim 1 wherein said first wall includes a cover hook catch at the distal edge of said first wall, said cover hook catch shaped substantially like a question mark.

6. The raceway of claim 1 wherein said cover hook stop includes an arcuate outer surface.

7. The raceway of claim 1 wherein said cover hook includes a distal edge, said distal edge formed to be substantially perpendicular to said cover wherein said distal edge includes a rounded edge, wherein said rounded edge includes an angled straight edge at its distal end.

8. The raceway of claim 1 wherein said first catch, said second catch, said first catch stop and said second catch stop form channels.

9. The raceway of claim 1 wherein said bottom exterior surface includes an adhesive strip.

* * * * *